United States Patent [19]

Coleman et al.

[11] 4,187,901

[45] Feb. 12, 1980

[54] FLAT PLATE SOLAR HEAT COLLECTOR

[76] Inventors: Robert A. Coleman, 753 Hanover St., Livermore, Calif. 94550; Larry D. Beard, 256 Manitoba Green, Fremont, Calif. 94538

[21] Appl. No.: 847,707

[22] Filed: Nov. 2, 1977

[51] Int. Cl.[2] .............................. F28F 1/22; F24J 3/02
[52] U.S. Cl. .................................... 165/47; 126/415; 126/447; 126/448; 165/171; 165/174; 165/DIG. 13
[58] Field of Search ............................... 165/173–175, 165/178, 171, 170, 47, DIG. 13; 126/271; 62/527, 511

[56] References Cited

U.S. PATENT DOCUMENTS

| | | | |
|---|---|---|---|
| 1,137,137 | 4/1915 | Heaton | 165/174 |
| 2,163,591 | 6/1939 | Deverall | 165/174 |
| 2,336,879 | 12/1943 | Mekler | 165/174 |
| 2,382,255 | 8/1945 | Pyzel | 165/174 |
| 2,707,868 | 5/1955 | Goodman | 165/174 |
| 4,018,271 | 4/1977 | Jones et al. | 165/175 |
| 4,086,913 | 5/1978 | Gavin | 165/173 |
| 4,098,331 | 7/1978 | Ford et al. | 165/174 |
| 4,105,042 | 8/1978 | Johnston, Jr. | 126/271 |

*Primary Examiner*—Sheldon Richter
*Attorney, Agent, or Firm*—Francis H. Lewis

[57] ABSTRACT

A collector for radiant heat energy is disclosed, containing a radiation-absorbing heat-conducting panel in thermal contact with a series of "riser" tubes, through which a working fluid flows, thereby carrying away the radiant heat incident on the panel and absorbed by the fluid. A pair of larger diameter "header" pipes are connected to opposite ends of the riser tubes, providing access for the working fluid to and from the risers, and conducting the fluid to the pump driving the fluid motion and to the thermal "load" or object desired to be heated. Each riser tube intersects and passes through the interior of each header pipe, and the short end of the riser tube emerging from the opposite side of the header pipe is sealed by means of a cap which may be removed to facilitate cleaning of the riser tubes. Fluid passes between the risers and headers through a series of "metering holes" which are drilled through the walls of the riser tubes and located in the interior of the header pipes. These metering holes are sufficiently small to ensure that the fluid flows uniformly through all risers in any panel position, thereby minimizing temperature gradients in the panel and providing maximum thermal efficiency. In an alternative version, the panel is built up around an obstacle by cutting out sections of the risers which would otherwise intersect the obstacle and connecting the truncated ends of the risers to a common pipe which circumscribes the obstacle.

4 Claims, 6 Drawing Figures

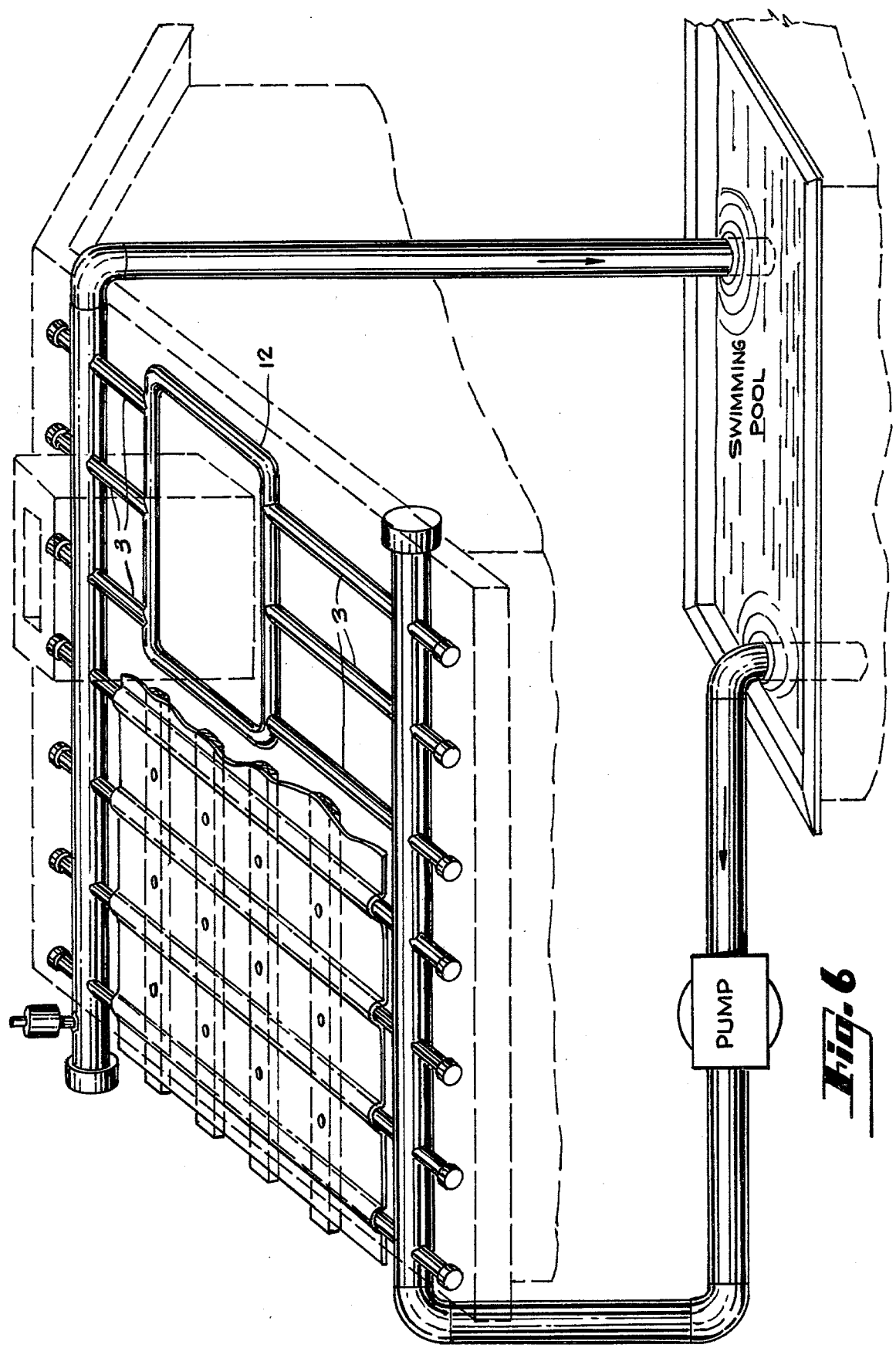

FLAT PLATE SOLAR HEAT COLLECTOR

BACKGROUND OF THE INVENTION

1. Field of the Invention

This invention pertains generally to the field of heat exchangers, and more particularly to devices for absorbing or emitting radiant heat energy in order to heat or cool specific objects. The invention finds particular application as a device for utilizing solar heat energy.

2. Description of the Prior Art

Conventional solar heat collectors generally contain a flat dark-colored panel or other means for absorbing the sun's radiation, and a system of pipes or channels for bringing a working fluid into thermal contact with this panel and carrying away the absorbed heat energy. The working fluid is distributed over the area of the panel through a series of "riser" tubes which are fed by, and discharge into, larger diameter "header" pipes, and these risers and headers together constitute the above-mentioned system. The header pipes are connected to a conduit for transporting the heated working fluid to the thermal "load", which may be an object desired to be heated or another heat exchanger, and seriately to a pump or other means for impelling the fluid through the system. The cooled working fluid is conducted back into the inlet header pipe of the collector, thereby completing the hydraulic circuit. The working fluid may be water or any other liquid substance with a substantial heat capacity. Water systems are commonly used to heat swimming pools, or to provide heated water for domestic or industrial use. A water-operated solar collector may also serve as a primary or auxiliary source of heat for space heating inside buildings.

In order to carry out the above heat exchange process with maximum thermal efficiency, it is desirable to reduce temperature gradients within the collector panel. Therefore the riser tubes should be relatively small in diameter and dispersed evenly over the collector panel, and the flow through the risers should be uniform in order to transport heat from each section of the collector panel with equal efficiency. This implies that the header pipes should discharge into or receive from each riser tube with an equal flow rate. If the risers intercommunicate with the headers through ordinary "tee" connections, this uniformity of flow may be difficult to accomplish in many circumstances without a complex and expensive mechanism for regulating simultaneously the flow through each riser tube. If the collector panel, riser tubes and header pipes are all perfectly horizontal, this uniformity may be achieved simply by constructing each riser tube to be the same diameter. However, in a tilted position, for example on a slanted roof, such a collector may produce a non-uniform flow rate as a result of gravitational effects on the fluid, with the concomitant appearance of "hot spots" in the panel and loss of efficiency. Similarly, varying the riser tube diameters to produce a uniform flow in a given slanted collector position may result in a non-uniform flow if the collector panel is placed in a different position. In short, it is difficult to obtain the desired uniformity of flow rate in conventional solar collector systems without unduly restricting the panel orientation.

A second problem with conventional collectors arises from the necessity for regular cleaning of the interior of the riser tubes. These tubes are small in diameter and subject to considerable heat, and deposits of dirt, rust, or other impurities develop on their interior walls. Such deposits constrict the flow through the risers and produce unevenness in the flow distribution, thereby decreasing the thermal and energetic efficiencies of the collector system. The riser tubes must be cleaned regularly to prevent buildup of these deposits. However, in a conventional collector these risers are terminated at both ends in header pipes or some other fluid distribution conduit system which does not allow ready and immediate access to the interior of the riser tubes for cleaning purposes. In order to clean the risers, they must either be removed from the collector or the hydraulic circuit must be broken open at some point, and this breaking point is generally different for each riser tube. Therefore cleaning the risers in a conventional collector presents a substantial plumbing task.

Conventional solar heat collectors are generally restricted in the panel shapes which may be allowed by the collector design. Many collectors are limited to rectangular or simple quadrangular configurations. In particular, where there are chimneys, ventilation pipes, or other obstacles on a roof, the conventional collectors must be built up in separate sections around these obstacles, thereby increasing substantially the complexity of the plumbing required to distribute the working fluid to these sections. If instead a hole is cut in the collector panel to accommodate the obstacle, the riser tube network must be designed to distribute the flow around this hole as uniformly as possible. Since the collector is often in a tilted position, this design task may not be a simple one, and in a conventional collector a given design will generally work only for certain panel orientations.

Therefore, it is an object of this invention to provide a solar heat collector system in which the working fluid is distributed evenly throughout the collector panel at a uniform flow rate in any panel position.

Another object of this invention is to provide a solar heat collector system which allows easy access to and cleaning of the interior walls of the working fluid distribution tubes, or "riser" tubes.

A further object of this invention is to provide a solar heat collector system which allows holes or indentations to be cut in the collector panel to accommodate obstacles without disturbance of the uniformity of flow rate of the working fluid in the remaining portions of the panel.

SUMMARY OF THE INVENTION

The present invention is a solar heat collector which fulfills the objects and overcomes the limitations recited above. Briefly, this collector consists of a radiant heat-absorbing panel, normally metal, which is traversed by and in thermal contact with a series of riser tubes through which a heat-carrying fluid flows, causing the panel to function as a heat exchanger, and a pair of header pipes connected to opposite ends of the riser tubes to provide for ingress and egress of this heat-carrying working fluid. The header pipes transport the fluid to the thermal load or heat-absorbing object, and to the pump which drives the fluid, thence back to the riser tubes to complete the circuit. The risers preferably consist of a large number of parallel, evenly spaced tubes, distributed extensively over the surface of the panel.

A novel feature of this invention resides in the manner in which the riser tubes are connected to the header pipes. The risers intersect each header at right angles, or some other angle appropriate to the specific panel shape, and each riser, being smaller in diameter than the header pipe, passes entirely through the center of the header pipe and emerges into a short stub on the opposite side. This stub is terminated by a cap which is easily removable to facilitate cleaning of the interior of the riser tubes. "Metering holes" are located in the walls of the portions of the riser tubes lying inside the header pipes, and the fluid passes between the risers and headers through these holes. The holes are small enough in diameter to constrict the flow sufficiently to ensure that the risers are entirely filled with fluid in any panel position, and that the flow is always uniform through all the risers.

A modified version of this invention is a solar heat collector wherein the panel described above includes one or more holes or indentations to enable the collector to fit around obstacles. In this version, sections of the pattern of parallel riser tubes must be removed where these tubes encounter the boundary of a hole or indentation and would otherwise intersect an obstacle. The truncated ends of these riser tubes are connected at the boundary to a common pipe which runs entirely around the perimeter of the obstacle, allowing fluid from these truncated risers to flow around the obstacle through this pipe into the continuation of the risers on the opposite side. Because of the metering hole design of the riser connection to the headers, uniformity of the flow rate is maintained in the riser tubes, despite the variation in the branches of the hydraulic circuit.

The objects and characteristics of this invention may be better understood by examining the following drawings, together with the detailed description.

BRIEF DESCRIPTION OF THE DRAWINGS

FIG. 6 is a perspective cut-away view of a larger version of a roof-top solar collector, showing in schematic form its application as a swimming pool water heater, and illustrating the modification to the riser tube connections to allow the collector to fit around a chimney.

DETAILED DESCRIPTION OF THE INVENTION

The preferred embodiment of this invention as described in the following paragraphs is a roof-top solar heat collector which supplies heat for a swimming pool. Therefore the working fluid in this embodiment is water.

Figure 1:
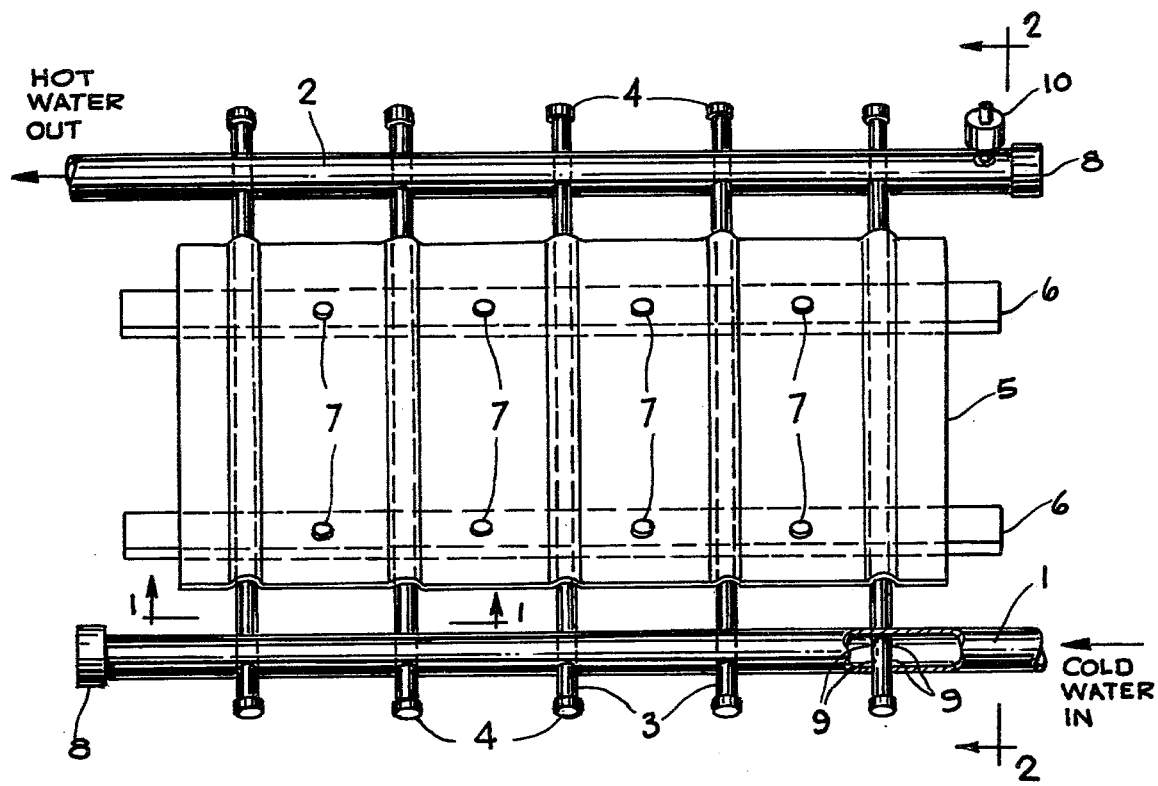
FIG. 1 is a horizontal view of the solar collector in a slanted position, as for example resting on the canted surface of a roof, wherein the working fluid is assumed to be water.
Figure 2:
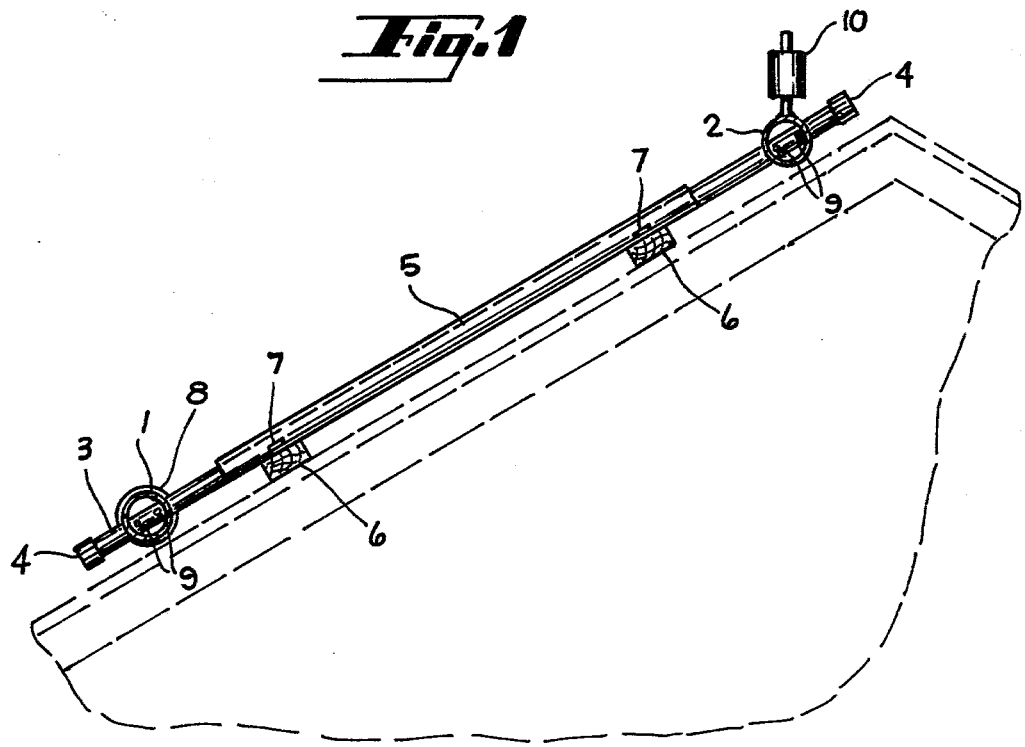
FIG. 2 is a horizontal sectional view of the solar collector taken along the lines 2—2 in FIG. 1, showing the placement of the collector on the sloping roof.

Referring now to FIGS. 1 and 2, cool water enters the solar collector through the horizontal header pipe 1 shown in the lower part of the drawings, and heated water leaves the collector through the upper horizontal header pipe 2 as shown. The two header pipes 1 and 2 are parallel and connected to each other through a series of parallel riser tubes 3 spaced at equal intervals, which tubes are smaller in diameter than the two header pipes and intersect the header pipes at right angles. Thus the centers of the header pipes 1 and 2 and the riser tubes 3 all lie in a common plane which is parallel to the sloping surface of the roof shown in FIG. 2. The header pipe 1 is connected near one end of each riser tube 3, and the other header pipe 2 is connected to each riser tube near the opposite end. The riser tubes pass entirely through the centers of the header pipes 1 and 2 and extend into short sections on the opposite sides of these header pipes. The short sections are terminated by caps 4 which are soldered to the risers in this particular embodiment, thereby being easily removable for purposes of cleaning these tubes.

Still referring to FIGS. 1 and 2, the riser tubes 3 are covered by a rectangular metal panel 5 which lies between the header pipes 1 and 2. The upper surface of this panel is painted a dark color, and solar radiation incident on this surface is thereby absorbed by the panel as heat energy. The panel is shaped to conform to the cylindrical exterior surfaces of the riser tubes, and is fastened to these surfaces in a manner described below in more detail, and the portions of this panel lying between and outside the riser tubes are flat. The solar collector is supported by parallel wooden beams 6 lying beneath the riser tubes and resting on the surface of the roof. These beams are parallel to the header pipes 1 and 2, the perpendicular to the riser tubes 3, and they extend over the entire length of the solar collector. The flat sections of the panel 5 are flush against the upper surfaces of these beams, and these sections are fastened securely to the beams by means of fasteners 7, which are described below in more detail. Thus, the entire collector forms a rigid structure.

Further, the header pipes 1 and 2 are terminated by caps 8 on the ends opposite to the water inlet and outlet pipes. The water flows between the header pipes and riser tubes through small metering holes 9 in the portions of the riser tubes located inside the header pipes, described below in further detail. Finally, the upper header pipe 2 is fitted with a conventional vent valve 10, preferably of the Bell and Gossett type which is old in the art.

Figure 3:
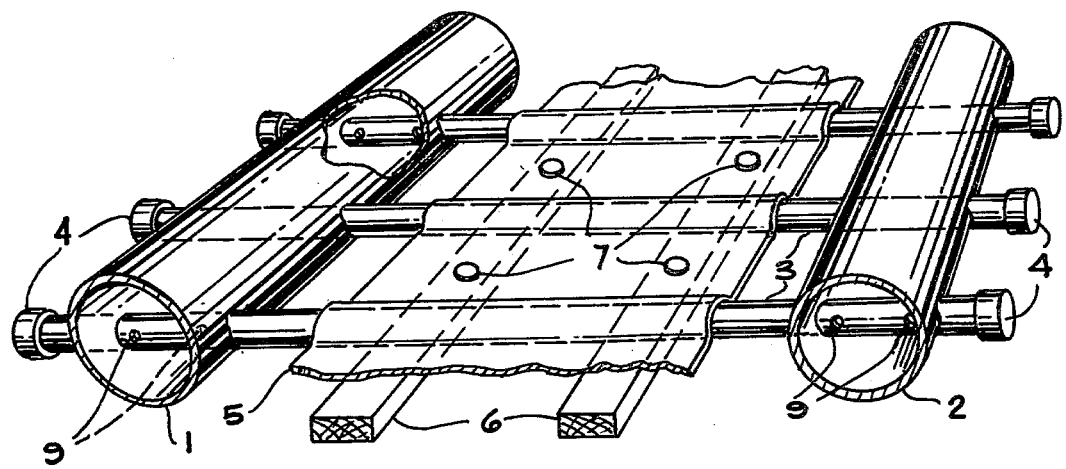
FIG. 3 shows a perspective cut-away end view of the solar collector in a horizontal position, illustrating the relationship between the collector panel, the riser tubes, and the header pipes in schematic form.
Figure 4:
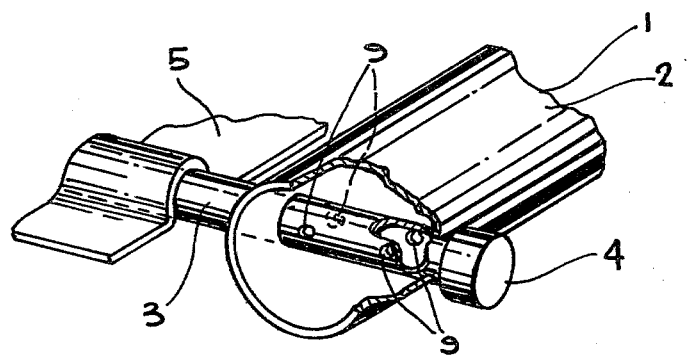
FIG. 4 shows a magnified cut-away view of the detailed design of the connection between a riser tube and a header pipe in the collector.

Referring now to FIGS. 3 and 4, the portion of each riser tube 3 lying inside a given header pipe 1 or 2 is perforated by four metering holes 9 extending horizontally through the wall of the riser tube and located laterally and symmetrically on both sides of the riser tube. These holes are equal in diameter on all riser tubes in both header pipes. The metering holes are sufficiently small that the constriction of the water flow by these holes dominates the hydraulic pressure loss in the collector, so that the flow rate is the same in each riser tube. Generally, the total area of all metering holes inside a given header pipe must not exceed the interior area of a cross section of that pipe by more than ten percent. However a more stringent metering hole size criterion is necessary for collectors with a particularly small number of riser tubes, or with riser tubes having especially small diameters. For a given configuration of riser tubes and header pipes, this metering hole size criterion may be determined by methods which are conventional and known to persons skilled in the art to which this invention pertains.

Figure 5:
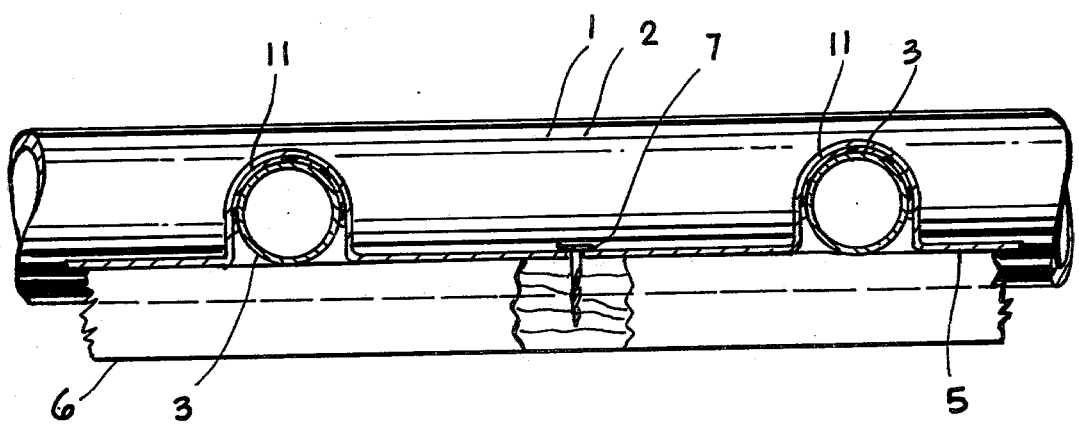
FIG. 5 is a cut-away sectional view of the solar collector in FIG. 1 taken along the lines 1—1, looking in a direction parallel to the sloping surface of the roof and the riser tubes.

Referring now to FIG. 5, the metal collector panel 5 is shaped to fit snugly around the upper hemicylindrical exterior surfaces of the riser tubes 3. The panel extends downward from both sides of these cylindrical surfaces to the points where it intersects the plane tangent to the lower surface of all the riser tubes, which plane is also congruent to the upper surfaces of the support beams 6. At these points the panel is bent at right angles along lines parallel to the riser tubes, so that the lower surfaces of the sections of the panel located between and outside the riser tubes lie in the above-specified plane and fall flush against the upper surfaces of the support beams 6. These flat sections of the panel are fastened to the support beams by means of fasteners 7, which constitute drive nails extending through holes in the flat panel sections into the wooden support beams. The lower hemicylindrical surfaces of the panel 5 are joined to the upper surfaces of the riser tubes 3 by means of the glued joints 11. The glue in these joints has satisfactory thermal as well as mechanical properties to efficiently conduct heat from the panel 5 to the riser tubes 3. In the present embodiment this glue is the "732 Silastic" type, manufactured by Dow Chemical Company, and is well known in the art relevant to this invention.

Not shown in the drawings of FIGS. 1 through 5 are the swimming pool heated by this solar heat collector and the pump which drives the water through the collector. Referring now to FIG. 6, a modified version of the preferred embodiment is illustrated in which this pump and swimming pool are indicated schematically. This version modifies the collector system shown in the previous drawings in that it contains a larger number of riser tubes and support beams. Also, the solar collector in this modified version fits around a chimney on the roof where the collector is located. The riser tubes 3 lying along lines intercepted by this chimney are all connected to a common pipe 12 in the plane of the riser tubes, encircling the chimney and forming a closed hydraulic loop. Each riser tube is joined to the pipe 12 at the point where it meets this perimeter and the sections of the riser tubes which would otherwise lie inside this perimeter are therefore removed. The portions of the panel and the wooden beam supports which would fall inside this perimeter are also removed to accommodate the chimney.

Finally, although the above description of this invention is cast in terms of a device for collecting solar heat and transferring it to some object by means of a working fluid, it will be noted that this invention is a heat exchanger with applications which are more general than the above heat-collecting function. Thus, a further modification of this invention is obtained by replacing the thermal load or swimming pool by a heat source or object which is desired to be cooled. This version of the device pumps heat in the opposite direction, and the panel radiates energy into space. The device may be operated in this mode at night or during hours when the sun's rays are obscured, acting as a refrigerator. It may also be used in this way to generate heat radiation.

What is claimed is:

1. A heat exchanger for conveying heat energy to or from a fluid, comprising:
   a panel which absorbs or emits heat, and which is cut to partially or completely surround an area which is not covered by the panel;
   a plurality of tubes through which the fluid flows, the tubes being in thermally conductive contact with the panel;
   means for constricting the fluid flow through each of the tubes, thereby regulating the flow rate in each tube;
   channel means for conducting the fluid to and from the tubes;
   means for impelling the fluid through the tubes; and
   a common pipe running along the boundary of the uncovered area, the pipe being connected to each tube section which intersects this boundary.

2. A heat exchanger as recited in claim 1, wherein the flow constricting means comprises a plurality of holes in the walls of the tubes, the holes being small compared to the diameter of the tubes, and the fluid being constrained to flow into and out of the tubes through the holes.

3. A heat exchanger as recited in claim 2, wherein the channel means comprises one or more pipes, each pipe conducting the fluid to or from the tubes, and each end of every tube being connected to one of the pipes, the holes in the tubes being located at the connections to the pipes.

4. A heat exchanger as recited in claim 3, wherein each tube is smaller in diameter than either pipe to which it is connected, and the tube connects to either pipe by intersecting its walls and extending entirely through the interior of the pipe and into a tube section on the opposite side of the pipe, the holes being located on the tube portion inside the pipe, further comprising removable plugging means for hydraulically sealing and opening the tube section.

* * * * *